US007018051B2

(12) United States Patent
Bok

(10) Patent No.: US 7,018,051 B2
(45) Date of Patent: Mar. 28, 2006

(54) COOLING APPARATUS OF COLOR WHEEL OF PROJECTOR

(75) Inventor: Ki So Bok, Seoul (KR)

(73) Assignee: LG Electronics Inc., Seoul (KR)

(*) Notice: Subject to any disclaimer, the term of this patent is extended or adjusted under 35 U.S.C. 154(b) by 177 days.

(21) Appl. No.: 10/163,202

(22) Filed: Jun. 4, 2002

(65) Prior Publication Data

US 2002/0180938 A1 Dec. 5, 2002

(30) Foreign Application Priority Data

Jun. 4, 2001 (KR) ........................................ 2001/31063

(51) Int. Cl.
*G03B 21/14* (2006.01)

(52) U.S. Cl. .......................................... 353/84; 348/743

(58) Field of Classification Search .................. 353/84, 353/52, 61; 348/742, 743, 771
See application file for complete search history.

(56) References Cited

U.S. PATENT DOCUMENTS 6,024,453 A * 2/2000 Edlinger et al. .............. 353/84
2002/0109821 A1 * 8/2002 Huibers et al. ............... 353/84

* cited by examiner

*Primary Examiner*—William Dowling
(74) *Attorney, Agent, or Firm*—Hong, Degerman, Kang & Schmadeka

(57) ABSTRACT

Disclosed is a cooling apparatus of a color wheel for color separation in a single plate type projector and a projection system using the projector, which comprises an airflow generator, thereby cooling the color wheel and a rod lens of the single plate type projector. The cooling apparatus of the color wheel of the projector of the present invention prevents the color wheel and the rod lens from being thermally degraded by using the high-powered lamp. Further, an airflow generator such as the airfoil-shaped or plate-shaped blades is formed on a hub of the color wheel, thereby miniaturizing the system of the projector and reducing its production cost.

14 Claims, 5 Drawing Sheets

COOLING APPARATUS OF COLOR WHEEL OF PROJECTOR

BACKGROUND OF THE INVENTION

1. Field of the Invention

The present invention relates to the field of the cooling of a projector, and more particularly to a cooling apparatus of a color wheel for color separation in a single plate type projector and a projection system using the projector. The cooling apparatus comprises an airflow generator, thereby cooling the color wheel and a rod lens of the single plate type projector.

2. Description of the Related Art

A general projector comprises three picture displays. The picture display may be a projective liquid crystal display (LCD), a digital micro-mirror display (DMD), or a reflective liquid crystal display (LCD). Each of light sources including red, green, and blue colors is provided to a corresponding one of three picture displays. Then, the projector combines the colors, thereby displaying a picture. However, a single plate type reflective projector comprises one picture display. The light sources including red, green, and blue colors are provided to the single picture display in a time-sharing mode or in a blocked scroll mode, thereby outputting a synchronized picture signal. That is, the single plate type reflective projector refers to a projector for displaying a color picture using one picture display.

FIG. 1 is a schematic view showing an optical arrangement in a conventional reflective projector.

With reference to FIG. 1, the conventional reflective projector comprises a lamp 100, a color wheel 110, a rod lens 120, a first lens 130, a reflecting mirror 140, a second lens 150, a prism 160 with a panel 161, and a projecting lens 170.

The color wheel 110 serves to separate light generated by the lamp 100 into three colors, i.e., red, green, and blue colors. Herein, the light generated by the lamp 100 is metal halide or xenon.

The color wheel 110 is rotated by a driving gear (not shown). Three filters corresponding to each color such as red, green, and blue are distributed on the color wheel 110 into equal parts.

The rod lens 120 serves to irregularly reflect incident light, thereby mixing the incident light and generating uniform light. The light passing through the rod lens 120 is provided to the panel 161 of the prism 160 via an optical system including the first lens 130, the reflecting mirror 140, and the second lens 150, thereby reflecting a synchronized picture signal and expensively projecting the signal through the projecting lens 170.

In this case, in order to control the shape of focused light, instead of a fly eye lens (FEL), the projector uses the rod lens 120. Therefore, the light generated by the lamp 100 is focused on a plane of incidence of the rod lens 120 having a small area.

FIGS. 2*a* and 2*b* show a color wheel of a conventional reflective projector in detail.

With reference to FIGS. 2*a* and 2*b*, the light generated by a lamp 210 passes through the color wheel 220. At this time, the color wheel 220 serves to separate the light generated by the lamp 210 into plural colors. The separated light is incident on a plane of incidence of a rod lens 230.

FIG. 2*a* is a perspective view of the color wheel 220 of the conventional reflective projector, and FIG. 2*b* is a cross-sectional view of the color wheel 220 of the conventional reflective projector.

As shown in FIG. 2*b*, the light generated by the lamp 210 passes through the color wheel 220 and is focused on the plane 231 of incidence of the rod lens 230, thereby overheating a plane 221 of the color wheel 220 as well as the plane 231 of incidence of the rod lens 230.

A glass with high refractivity, such as BK-7 which is used as lens material, has a heat resistance, to a maximum temperature of about 400. A color separation filter used in the color wheel is generally made of polymer and has a heat resistance, to a maximum temperature of about 200.

The color wheel 220 is rotated by the driving gear (not shown). The rotation of the color wheel 220 increases the incident area of light. Airflow generated by the rotation of the color wheel 220 provides a cooling effect to the color wheel 220 itself. Therefore, during the operation of the projector, the color wheel 220 can be cooled itself to some degree.

However, during the operation of the projector, a large quantity of the light is always focused on the small area of the rod lens 230, i.e., the plane 231 of incidence. Therefore, although the material of the rod lens 230 has a heat resistance greater than that of the color wheel 220, the rod lens 230 is not high in heat resistance. Particularly, when the plane 231 of incidence of the rod lens 230 is coated, the resistance to thermal degradation of the coating layer cannot be assured.

Recently, a brighter projector has been required more and more. In order to satisfy this recent trend, a high-powered lamp is required. In this case, a color separation system including the color wheel and the rod lens of the single plate type optical system further demands a cooling apparatus for cooling the color wheel and the rod lens.

SUMMARY OF THE INVENTION

Therefore, the present invention has been made in view of the above problems, and it is an object of the present invention to provide a cooling apparatus of a color wheel for color separation in a single plate type projector and a projection system using the projector, which comprises an airflow generator, thereby cooling the color wheel and a rod lens of the single plate type projector.

In accordance with one aspect of the present invention, the above and other objects can be accomplished by the provision of a cooling apparatus of a color wheel of a projector. The cooling apparatus comprises a light source for generating light, a color wheel, on which the light generated by the light source is incident, including blades for generating airflow by the rotation of the color wheel, and a lens, on which the light having passed through the color wheel is incident.

Preferably, the light source may comprise a lamp, and the lens may be a rod lens.

Further, preferably, the blades may be shaped in an airfoil or a plate, and installed on both side surfaces of the color wheel.

In accordance with another aspect of the present invention, there is provided a cooling apparatus of a color wheel of a projector, wherein light generated by a light source is incident on the color wheel, and blades are installed on a hub of the color wheel, thereby generating airflow by the rotation of the color wheel.

Preferably, the blades may be shaped in an airfoil or a plate, and installed on both side surfaces of the color wheel.

The cooling apparatus of the color wheel of the projector of the present invention prevents the color wheel and the rod lens from being thermally degraded by using the high-powered lamp.

Further, an airflow generator such as the airfoil-shaped or plate-shaped blades is formed on a hub of the color wheel, thereby miniaturizing the system of the projector and reducing its production cost.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
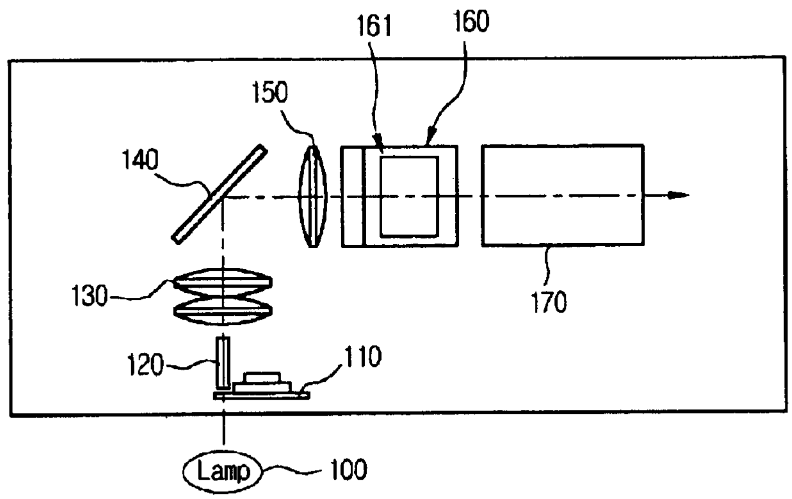
FIG. 1 is a schematic view showing an optical arrangement of a conventional reflective projector.
Figure 2A:
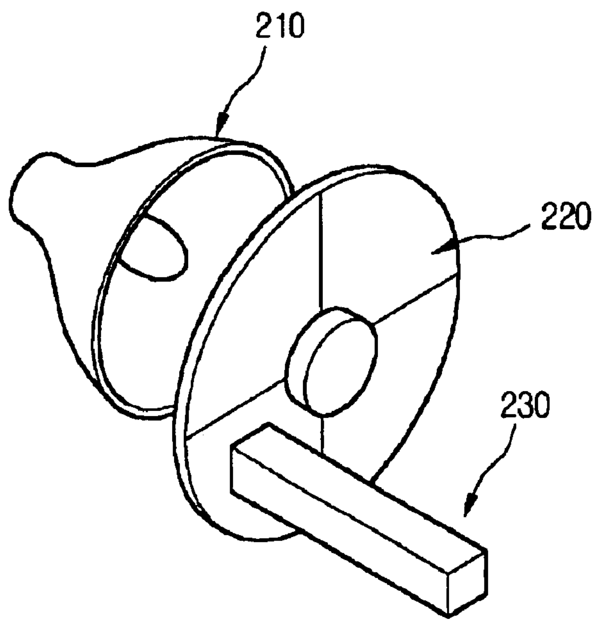
FIGS. 2*a* and 2*b* are a perspective view and a cross-sectional view of a color wheel of a conventional reflective projector, respectively.
Figure 2B:
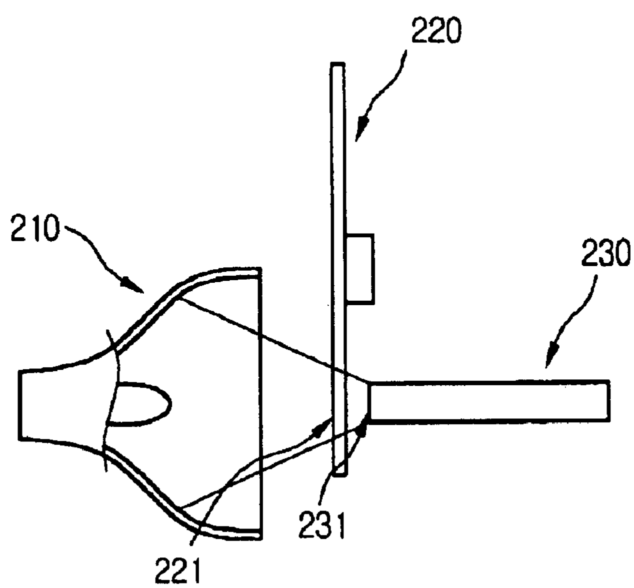
Figure 3A:
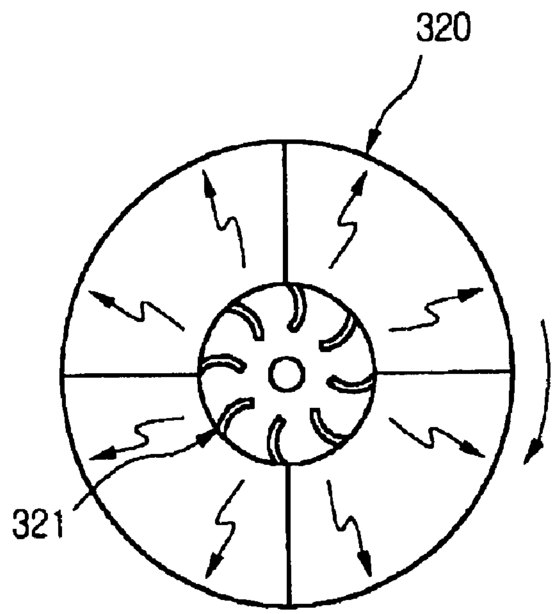
FIGS. 3*a* and 3*b* are a plan view and a perspective view of a cooling apparatus of a color wheel of a projector in accordance with an embodiment of the present invention, respectively.
Figure 3B:
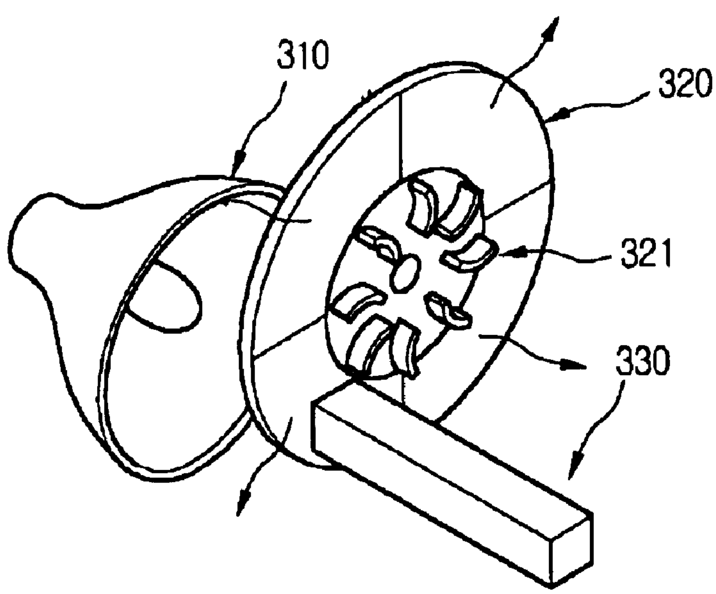

FIGS. 3*a* and 3*b* are a plan view and a perspective view of a cooling apparatus of a color wheel of a projector in accordance with an embodiment of the present invention, respectively.

With reference to FIGS. 3*a* and 3*b*, the cooling apparatus of the color wheel of the projector in accordance with an embodiment of the present invention comprises a light source 310 for generating light, a color wheel 320, on which the light generated by the light source 310 is incident, and a lens 330, on which the light having passed through the color wheel 320 is incident. A plurality of airfoil-shaped blades 321 are installed on the color wheel 320. The airfoil-shaped blades 321 serve to generate airflow for preventing the color wheel 320 from being thermally degraded by the energy of the incident light.

Generally, a lamp is used as the light source 310. The light generated by the lamp is separated into red, green, and blue colors by the color wheel 320. Then, the separated light passes through the lens 330.

Three color filters such as red, green, and blue filters are distributed on the color wheel 320 into equal parts. The color wheel 320 is rotated by a driving gear (not shown). The lens 330 irregularly reflects the incident light, thereby mixing the incident light and generating uniform light.

Herein, the lens 330 is a rod lens.

The airfoil-shaped blades 321 are formed on a hub of the color wheel 320. Therefore, as the color wheel 320 rotates, a airflow is generated by the airfoil-shaped blades 321, thereby blowing air in a centrifugal direction and cooling the heated color wheel 320 and lens 330 by the energy of the light generated by the light source 310.

Herein, the shape of the blade, i.e., the airflow generator of the color wheel of the projector, is not limited to the airfoil.

Figure 4A:
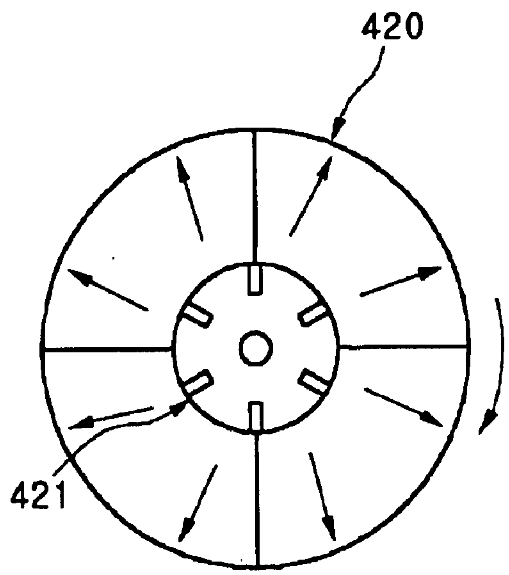
FIGS. 4*a* and 4*b* are a plan view and a perspective view of a cooling apparatus of a color wheel of a projector in accordance with another embodiment of the present invention, respectively.
Figure 4B:
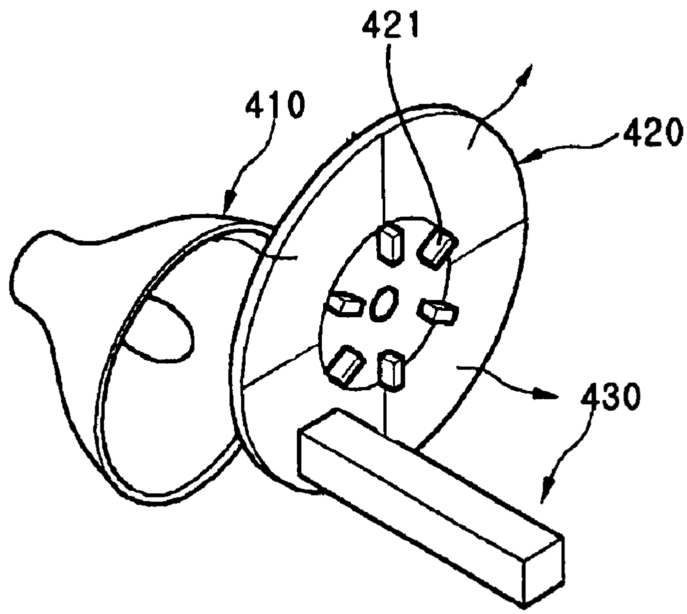

FIGS. 4*a* and 4*b* are a plan view and a perspective view of a cooling apparatus of a color wheel of a projector in accordance with another embodiment of the present invention, respectively.

With reference to FIGS. 4*a* and 4*b*, the configuration and function of the cooling apparatus of the color wheel of the projector in accordance with another embodiment of the present invention are similar to those of the aforementioned embodiment of FIGS. 3*a* and 3*b*, except for the shape of the airflow generator.

That is, the cooling apparatus of the color wheel of the projector in accordance with another embodiment of the present invention comprises a light source 410 for generating light, a color wheel 420, on which the light generated by the light source 410 is incident, and a lens 430, on which the light having passed through the color wheel 420 is incident. A plurality of plate-shaped blades 421 are installed on the color wheel 420. The plate-shaped blades 421 serve to generate airflow for preventing the color wheel 420 from being thermally degraded by the energy of the incident light. Herein, the lens 430 is also a rod lens.

The light generated by the light source 410 is separated into red, green, and blue colors by the color wheel 420. Then, the separated light passes through the lens 430. As the color wheel 420 rotates, airflow is generated by the plate-shaped blades 421 installed on a hub of the color wheel 420, thereby blowing air in a centrifugal direction and cooling the heated color wheel 420 and lens 430 by the energy of the light generated by the light source 410.

Compared to the cooling apparatus of the color wheel provided with airfoil-shaped blades 321, the cooling apparatus of the color wheel provided with the plate-shaped blades 421 is more easily manufactured, thereby reducing the production cost.

Those skilled in the art will appreciate that the shape of the blade, i.e., the airflow generator of the cooling apparatus of the color wheel of the projector, is not limited to the airfoil or the plate.

Figure 5A:
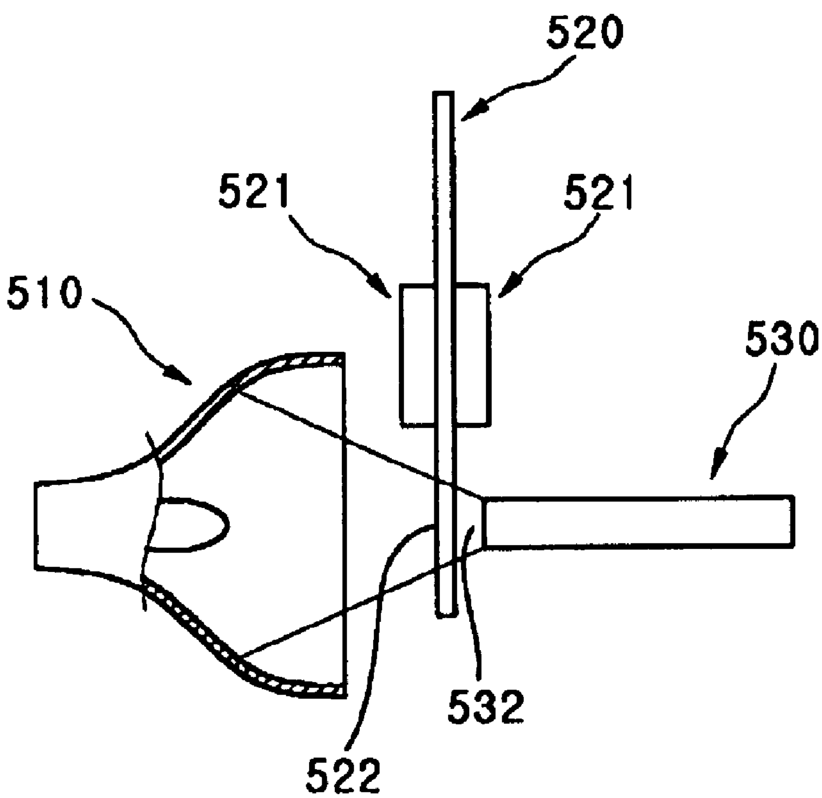
FIG. 5 is a cross-sectional view showing an operation of the cooling apparatus of the color wheel of the projector of the present invention.

FIG. 5 is a cross-sectional view showing an operation of the cooling apparatus of the color wheel of the projector of the present invention.

With reference to FIG. 5, the cooling apparatus of the color wheel of the projector of the present invention comprises a lamp 510 for generating light, a color wheel 520, on which the light generated by the lamp 510 is incident, a rod lens 530, on which the light having passed through the color wheel 520 is incident. Blades 521 for generating airflow so as to prevent the color wheel 520 from being thermally degraded by the energy of the incident light are installed on the color wheel 520. The blades 521 are shaped in an airfoil or a plate.

The light generated by the lamp 510 is separated into red, green, and blue colors by the color wheel 520. The separated light passes through the rod lens 530.

Three color filters such as red, green, and blue filters are distributed on the color wheel 520 into equal parts. The color wheel 520 is rotated by a driving gear (not shown).

The rod lens 530 irregularly reflects the incident light, thereby mixing the incident light and generating uniform light.

As the color wheel 520 rotates, the airfoil-shaped or plate-shaped blades 521 installed on the color wheel 520 generates airflow, thereby cooling the heated color wheel 520 and rod lens 530 by the energy of the light generated by the lamp 510.

In order to more effectively cool the color wheel 520 and the rod lens 530, the airfoil-shaped or plate-shaped blades 521 may be installed on both side surfaces of the color wheel 520.

The present invention is applied to the single type reflective projector. As described above, the single plate type reflective projector comprises one picture display. The light sources including red, green, and blue colors are provided to the single picture display in a time-sharing mode or in a blocked scroll mode, thereby outputting a synchronized picture signal. The light generated by the lamp 510 is separated into red, green, and blue colors by the rotating color wheel 520, in which three color filters such as red, green, and blue filters are distributed. The separated light is focused on the rod lens 530.

The light generated by the lamp 510 passes through the color wheel 520 and focused on a plane 532 of incidence of the rod lens 530, thereby imposing thermal overload to a plane 522 of the color wheel 520 as well as the plane 532 of incidence of the rod lens 530.

In accordance with the present invention, the cooling apparatus of the color wheel of the projector comprises the airfoil-shaped or plate-shaped blades 521, which are formed on a hub of the color wheel 520. The airfoil-shaped or plate-shaped blades 521 serve as an airflow generator using the rotary power of the color wheel 520. As the color wheel 520 rotates, the airfoil-shaped or plate-shaped blades 521 also rotate, thereby generating airflow around the color wheel 520 and the rod lens 530 and cooling the heated color wheel 520 and lens 530 by the energy of the light generated by the lamp 510.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling apparatus of a color wheel of a projector, said cooling apparatus comprising:

a light source for generating light;

a color wheel, on which the light generated by the light source is incident, including blades for generating airflow by the rotation of the color wheel; and a lens, on which the light having passed through the color wheel is incident.

2. The cooling apparatus of the color wheel of the projector as set forth in claim 1, wherein said light source comprises a lamp.

3. The cooling apparatus of the color wheel of the projector as set forth in claim 1, wherein said lens is a rod lens.

4. The cooling apparatus of the color wheel of the projector as set forth in claim 1, wherein said blades are shaped in an airfoil.

5. The cooling apparatus of the color wheel of the projector as set forth in claim 1, wherein said blades are shaped in a plate.

6. The cooling apparatus of the color wheel of the projector as set forth in claim 1, wherein said blades are installed on both side surfaces of the color wheel.

7. A cooling apparatus of a color wheel of a projector, wherein light generated by a light source is incident on the color wheel, and blades are installed on a hub of the color wheel, thereby generating airflow by the rotation of the color wheel.

8. The cooling apparatus of the color wheel of the projector as set forth in claim 7, wherein said blades are shaped in an airfoil.

9. The cooling apparatus of the color wheel of the projector as set forth in claim 7, wherein said blades are shaped in a plate.

10. The cooling apparatus of the color wheel of the projector as set forth in claim 7, wherein said blades are installed on both side surfaces of the color wheel.

11. A cooling apparatus of a color wheel of a projector, said cooling apparatus comprising:

a lamp for generating light;

a color wheel, on which the light generated by the lamp is incident, including blades for generating airflow by the rotation of the color wheel; and a rod lens, on which the light having passed through the color wheel is incident.

12. The cooling apparatus of the color wheel of the projector as set forth in claim 11, wherein said blades are shaped in an airfoil.

13. The cooling apparatus of the color wheel of the projector as set forth in claim 11, wherein said blades are shaped in a plate.

14. The cooling apparatus of the color wheel of the projector as set forth in claim 11, wherein said blades are installed on both side surfaces of the color wheel.

* * * * *